(12) United States Patent
Lambert

(10) Patent No.: US 7,761,706 B2
(45) Date of Patent: Jul. 20, 2010

(54) METHOD FOR CONTROLLING ACCESS TO PROTECTED CONTENT

(75) Inventor: Martin R. Lambert, Twyford (GB)

(73) Assignee: SealedMedia Limited (GB)

( * ) Notice: Subject to any disclaimer, the term of this patent is extended or adjusted under 35 U.S.C. 154(b) by 955 days.

(21) Appl. No.: 10/398,566

(22) PCT Filed: Oct. 11, 2001

(86) PCT No.: PCT/GB01/04544

§ 371 (c)(1),
(2), (4) Date: Apr. 8, 2003

(87) PCT Pub. No.: WO02/31632

PCT Pub. Date: Apr. 18, 2002

(65) Prior Publication Data

US 2004/0054894 A1 Mar. 18, 2004

(30) Foreign Application Priority Data

Oct. 11, 2000 (GB) ................... 0024919.3

(51) Int. Cl.
*G06F 12/14* (2006.01)
(52) U.S. Cl. ...................... 713/165; 713/193
(58) Field of Classification Search ................. 713/165, 713/164, 193
See application file for complete search history.

(56) References Cited

U.S. PATENT DOCUMENTS

| 5,561,788 A | 10/1996 | Letwin |
| 5,671,417 A | 9/1997 | Miclette et al. |
| 5,673,315 A | 9/1997 | Wolf |
| 5,899,987 A * | 5/1999 | Yarom ........................... 707/3 |
| 5,917,912 A * | 6/1999 | Ginter et al. ................. 713/187 |
| 5,974,549 A * | 10/1999 | Golan ........................... 726/23 |
| 6,141,698 A * | 10/2000 | Krishnan et al. ............. 719/331 |
| 6,282,657 B1 * | 8/2001 | Kaplan et al. .................. 726/1 |
| 6,868,495 B1 * | 3/2005 | Glover ........................ 713/190 |
| 2007/0204259 A1 * | 8/2007 | Wilner et al. ................ 717/124 |

FOREIGN PATENT DOCUMENTS

| WO | WO 98/33106 | 7/1998 |
| WO | WO 99/39261 | * 8/1999 |

* cited by examiner

*Primary Examiner*—Kambiz Zand
*Assistant Examiner*—Aubrey H Wyszynski
(74) *Attorney, Agent, or Firm*—Townsend and Townsend and Crew LLP

(57) ABSTRACT

A method is disclosed for controlling access by use of an operating system service to content that is to be protected from unauthorised access. The method includes the steps of, for an operating system service which can enable unauthorised access to protected content, modifying the operation of said operating system service to restrict or deny access to the protected content.

51 Claims, 11 Drawing Sheets

Before patching

The patching process

After patching

After installing trap patch

Before installing trap patch

METHOD FOR CONTROLLING ACCESS TO PROTECTED CONTENT

This application is the National Phase of International Application PCT/GB01/04544 filed Oct. 11, 2001 which designated the U.S. and that International Application was published in English under PCT Article 21(2) on Apr. 18, 2002 as International Publication Number WO 02/31632 A2. PCT/GB01/04544 claims priority to British Application No. 0024919.3, filed Oct. 11, 2000. The entire contents of these applications are incorporated herein by reference.

The present invention relates to a method for controlling access to protected content. The present invention has particular relevance for operating system (OS) security and to preventing access to OS services that would otherwise directly or indirectly enable unauthorised access to Digital Rights Management (DRM)-protected content.

If there is to be a viable commerce based upon the electronic distribution of valuable multimedia content (such as for example reports, images, music tracks, videos, etc.), then there must be some means of enforcing and retaining copyright control over the electronic content.

There is now emerging a set of hardware and software solutions, generically known as digital rights management (DRM) solutions, that aim to provide this copyright control while, to a varying degree, also enabling new commercial methods suited to the Internet and electronic delivery. Common to virtually all these solutions is the requirement that the multimedia content be distributed within a persistent tamper-proof encryption wrapper (the idea being that a million copies of encrypted content is no more valuable than one). Very simply, DRM works by carefully providing the consumers of this encrypted content with secret decryption keys that provide temporary access to the content for some controlled purpose, e.g. viewing, printing, playing, etc. without ever providing access to the raw decrypted content that could be used for unauthorised reuse or redistribution.

FIG. 1 illustrates schematically an overview of how typical DRM systems work. Referring to FIG. 1, a "publisher" of digital content seals their digital content, buffers or streams within a layer of encryption and digital signatures into a DRM-encrypted content format 102. The encryption makes it difficult for malicious consumers to obtain access to the raw decrypted content (and make unauthorised copies for redistribution). The digital signatures prevent malicious consumers or hackers from tampering with the encrypted content (perhaps to pass off the content as their own or to distribute for free content that normally has to be paid for) by enabling the DRM system to detect the smallest change to the encrypted content. The DRM-encrypted content 102 can then be delivered to consumers via any electronic distribution medium 104, e.g. web, ftp, email, CD-ROM, etc. The publisher need not worry about protecting the DRM-encrypted content 102 in transit to the consumer since it is inherently protected by its encryption layer and digital signatures.

Less sophisticated DRM systems sometimes bundle individual consumer access rights with the content, either within the encryption layer or at least protected by the digital signatures. The advantage of bundling rights with the content is that the consumer can obtain both the content and the rights at the same time. Disadvantages include extreme inflexibility in the rights management policies that can be implemented and an enormous versioning problem (since there needs to be a separate version of the encrypted content 102 for each consumer and a new version of the encrypted content whenever the rights change).

More sophisticated DRM systems deliver the rights separately from the content (from a DRM server 108). The rights are encoded in some electronic format 110 (i.e. electronic "rights") and specify the permitted relationship between consumers and DRM-encrypted content sets (and subsets), e.g. which content the consumer can access, what they are permitted to do with it (e.g. printing), and for how long.

A specialised viewer (the DRM client 106) resident on the consumer device is required to obtain, manage and interpret the rights, temporarily decrypt the encrypted content and view/play it within a secure environment (so that the consumer cannot obtain access to the raw decrypted content or the decryption keys) subject to the restrictions implied by the consumer's rights (e.g. view but do not print a document). The DRM server 108 is responsible for issuing rights to requesting DRM clients 106. Current DRM systems typically issue rights to authenticated consumers at the time of purchase (or grant) and the rights are transferred to permanent storage on the consumer device 106. The DRM server 108 plays no further role in the ongoing use of those rights.

A non-limiting description of several terms used herein will now be given to aid the understanding of the present invention.

In general, "rights" can be thought of as an electronic description (explicit or by implication) of the association between consumers (or consumer devices) and DRM-protected content sets. Rights can optionally specify means of identifying the consumer (or consumer device) to which the rights "belong"; means of identifying the content sets and subsets to which the rights apply; encryption keys and checksums (cryptographic or otherwise); and the specific access rights granted to the consumers (and/or their consumer devices) over those content sets (e.g. whether or not the consumer can print a document, the duration of access, etc.). Rights can be encoded in any machine-readable form (e.g. parsable languages, specialised data structures, etc.) and are used internally by the DRM system to grant, deny or meter consumer access to encrypted content.

"Consumer device" is a device by means of which consumers access DRM-encrypted content (e.g. view encrypted text or images, listen to DRM-encrypted music, watch DRM-encrypted video, etc) at the point of consumption.

"DRM client" refers to a specialised hardware and/or software component operating on the consumer device which is responsible for verifying the authenticity of the consumer and temporarily decrypting the encrypted content whilst it is being accessed and rendering the decrypted content in a consumable form without allowing the consumer to make copies of the decrypted content (e.g. displaying a DRM-protected image on the screen but protecting the image from screen grabbers). The DRM client is basically responsible for looking after the content owner's interests at the point of consumption.

"Operating system" (OS) refers to the (usually preinstalled) low-level software which handles the interface to peripheral hardware, schedules tasks, allocates storage, and presents a default interface to the user when no application program is running.

"Application" refers to high-level software, often supplied by third parties, that sits above the OS. Application software uses the services of the OS to indirectly interface to the hardware devices and to other software programs running on the computing device, without requiring specific low-level knowledge of those devices or software programs. Application software usually provides the end user with high-level services such as word processing, spreadsheets, web browsing, etc.

"Process" refers to a part of a running software program or other computing operation that performs a single task. A modern multi-tasking OS is capable of running multiple processes that, to the end user, give the appearance of running concurrently. An example of a process would be a web browser or a word processor application. Multiple instances of the same process can often (though not necessarily always) be run at the same time.

"Thread" refers to a portion of a process that can run independently of and concurrently with other portions of the process. In a modern OS, a process is often made up of multiple concurrently executing threads.

"Virtual memory" refers to a key feature of modern operating systems which provides applications with access to amounts of memory in excess (typically far in excess) of the physical memory available on the consumer device. This is achieved by swapping "virtual" memory areas between physical memory and permanent storage devices (e.g. hard disks).

"Loadable modules" refers to the components into which an OS is divided and which provide specific low-level services (e.g. file input/output, network communications, etc.) via defined entry points. Application software loads these modules into virtual memory and invokes these services by calling into entry points. These modules may be shared between processes in order to conserve virtual memory.

"Kernel code" refers to specialised OS modules that are invoked by loadable modules to invoke lower-level functionality, functionality that is typically (but not always) not directly accessible to application software. Kernel code is responsible for, amongst other things, providing a uniform interface to the wide variety of third party hardware devices (e.g. disk drives, sound cards, etc.) supported by modern computer devices.

"Device driver" refers to a special software program which is capable of operating within the kernel environment and capable of directly manipulating the low-level hardware components that make up the computing device (e.g. memory, video memory, disk drives, etc.)

FIG. 2 illustrates schematically how the various components defined above fit together within a typical consumer device running a modern OS. A consumer device generally has application software which typically provides high-level interaction between a user and the device and its peripherals. Application software includes, but is not limited to, DRM client 202a, web browser 202b, spreadsheet 202c and other applications 202d. Depending upon the needs of a particular application, loadable modules are loaded to provide low-level services, (e.g. file i/o (input/output), network communications etc.). Loadable modules include memory services 204a, audio services 204b, graphics services 204c, and other services 204d. To provide their services, the loadable modules invoke specialised kernel modules that provide access to hardware that is not directly accessible to application software. The kernel modules include virtual memory device driver 206a, audio driver 206b, video driver 206c, and other device drivers 206d. These drivers provide access to hardware such as physical memory 208a, sound card 208b, display 208c and other hardware or peripherals 208d. The combination of the kernel loadable modules and the device drivers comprises what is generally understood to be the device's operating system (OS).

In practice the dominant client device at present is some form of personal computer running a general purpose end-user OS such as Windows (or any of its variants), MacOS, UNIX, etc. The fact that these OS have been specifically designed to be open and extensible (in order to support third party application software and peripheral hardware development) makes it very difficult to build secure DRM client software.

Some manufacturers claim to have developed hardware DRM clients, generally in the form of specialised chips with on-board cryptographic functions, tamper-resistant storage, trusted clocks, etc. The implication is that DRM hardware is inherently more trustworthy and less vulnerable to tampering than DRM software. This is true in a limited sense but misleading since the DRM hardware must ultimately communicate with application-level software to display text or images or to play audio or video. The old truism that "a chain is only as strong as its weakest link" is particularly relevant here and the present invention is as relevant to "hardware" DRM solutions as to software DRM solutions.

One specific problem posed to DRM client implementers by the inherently insecure nature of the client OS relates to the fact that the decrypted content must ultimately be provided to the consumer. This often involves the DRM client handing off temporarily decrypted content to OS subsystems that were never designed for security. For example, in the case of text, images and video the decrypted content is drawn pixel by pixel to the video memory of the consumer device and then to the display device, where it is immediately vulnerable to determined hackers. On most computers the video memory is a shared resource, easily accessible to other software applications running on the same computer. There are a wide variety of "screen grabbers", some of which are built into the OS, which can at any time recover a pixel-by-pixel copy of the computer screen.

Another problem is that at some point the DRM client must hand off temporarily decrypted content to a separate software viewer component, e.g. a HTML renderer or audio codec, so that it can be presented to the consumer. The interface between the DRM client and the viewer component may not always be secure. For example, it may be the case that the decrypted content must be written to the computer's disk before it can be loaded by the viewer component. While the decrypted content is on the disk, it is vulnerable to discovery and duplication by hackers.

According to a first aspect of the present invention, there is provided a method for controlling access by use of an operating system service to content that is to be protected from unauthorised access, the method comprising the step of: for an operating system service which can enable unauthorised access to protected content, modifying the operation of said operating system service to restrict or deny access to the protected content.

Thus, in one preferred embodiment, the present invention provides a method for patching or otherwise modifying an OS kernel so that a digital rights management client can prevent access to OS services that would otherwise directly or indirectly enable unauthorised access to DRM-protected content. This is particularly useful for "retro-fitting" low level security to an otherwise insecure operating system.

The step of modifying the operation of said operating system service may comprise the steps of: obtaining an address of an entry point of the operating system service, and placing, starting at the entry point address, an instruction such that, when the instruction is executed, substitute code is executed, the substitute code operating to restrict or deny access to the protected content. The instruction may be a jump instruction.

The method may comprise the step of, after the substitute code is executed, returning the operating system service to its unmodified state. The step of modifying the operation of said operating system service may comprise the step of, prior to placing of the instruction, copying to a buffer a service preamble starting at the entry point address and wherein the step of returning the operating system service to its unmodified state includes the steps of restoring the service preamble that was copied to the buffer to its original position at the entry point address and returning control to the entry point address. Alternatively, the step of modifying the operation of said operating system service may comprise the step of, prior to placing of the instruction, copying to a buffer a service preamble starting at the entry point address and wherein the step of returning the operating system service to its unmodified state includes the steps of executing the service preamble from the buffer to which it was copied and then returning control to a point just after the place from which the service preamble was copied.

The step of modifying the operation of said operating system service may comprise the step of: replacing an address of an entry point of the operating system service in a trap dispatcher table with an address of an entry point of substitute code, the substitute code operating to restrict or deny access to the protected content.

The operating system service may be modified before any application processes are loaded. An initialisation module may be loaded before any application processes have been loaded, the modifying step being based on instructions in the initialisation module. The initialisation module is preferably loaded into every application process.

Some mechanism may be employed to propagate patches or other modification across all (or at least all relevant) operating system services.

Thus, there may be a loadable module that has initialisation code which when executed causes said modifying step to take place and clean-up code which when executed causes said modifying step to be undone, the method comprising the step of loading the loadable module into every running application process.

The step of loading the loadable module may be carried out as a result of the execution of another operating system service.

The act of loading the loadable module into a running application process may cause the initialisation code to be executed. The act of unloading the loadable module from a running application process may cause the clean-up code to be executed.

As an alternative, the method may comprise the step of a digital rights management client operating via an inter-process communication mechanism to cause the loadable module to execute its initialisation code and clean-up code within the context of each running application process.

The modification of the operating system service may function to protect, from screen grabbing, at least a visible area of an image displayed on a screen.

A virtual file system may be implemented that can be used to communicate decrypted content to a renderer without exposing the decrypted content to unauthorised access via a local file system.

The method may comprise the steps of: passing to a renderer a filename for a virtual file; requesting by the renderer access to the file; and, routing the renderer's access request via the virtual file system to a buffer containing the protected content. The step of decrypting the protected content may be carried out before placing the protected content in the buffer. As an alternative, the method may comprise the step of placing encrypted content in the buffer, the modified operating system service obtaining a decryption key to decrypt the encrypted content on demand.

The method may comprise the step of implementing a secure file system by which only trusted invocations of the operating system are permitted to decrypt encrypted files stored within an encrypted portion of the secure file system. Said encrypted portion of the file system may contain protected content and associated licensing information.

The method may comprise the steps of: establishing guard points to indicate which processes, threads, and/or windows are trusted; and, restricting execution of the operating system service only to the trusted processes, threads, and/or windows.

Operation of the operating system service may be modified by use of for example a device driver, a file system hook, or an installable file system module.

So-called upstream and downstream patches may be applied by a malicious user. These can be used to allow access to the protected content, which plainly is not desired.

Thus, the method preferably comprises the step of inspecting the operating system service for the presence of a downstream patch or hook. The step of inspecting the operating system service may include the steps of comparing a snapshot of the operating system service with a snapshot of the operating system service obtained during operating system startup.

The method may comprise the step of detecting an upstream patch or hook by determining whether a patched operating system service entry point still points to substitute code installed by a digital rights management client.

The method may comprise the step of detecting an upstream patch or hook by removing and then reinstalling a patch installed by a digital rights management client.

According to a second aspect of the present invention, there is provided a method for controlling access by use of an operating system service to content that is to be protected from unauthorised access, the method comprising the steps of: running an untrusted application routine; and, prior to the application routine using an operating system service that would enable unauthorised access to content which is to be protected, determining whether use of said operating system service would cause said operating system service to access said content and, if so, restricting or denying the operating system service access to said content.

This second aspect relates to an operating system which is already provided with the functionality described above, i.e. it is not necessary to "retro-fit" the low level security described herein; rather, that low level security is already provided.

Preferred and optional features of the second aspect are similar to at least some of the preferred and optional features of the first aspect.

The present invention also relates to a computer program containing program instructions for causing a computer to perform a method as described above. The computer program may be embodied in a digital rights management client.

Embodiments of the present invention will now be described by way of example with reference to the accompanying drawings, in which.

Figure 10:
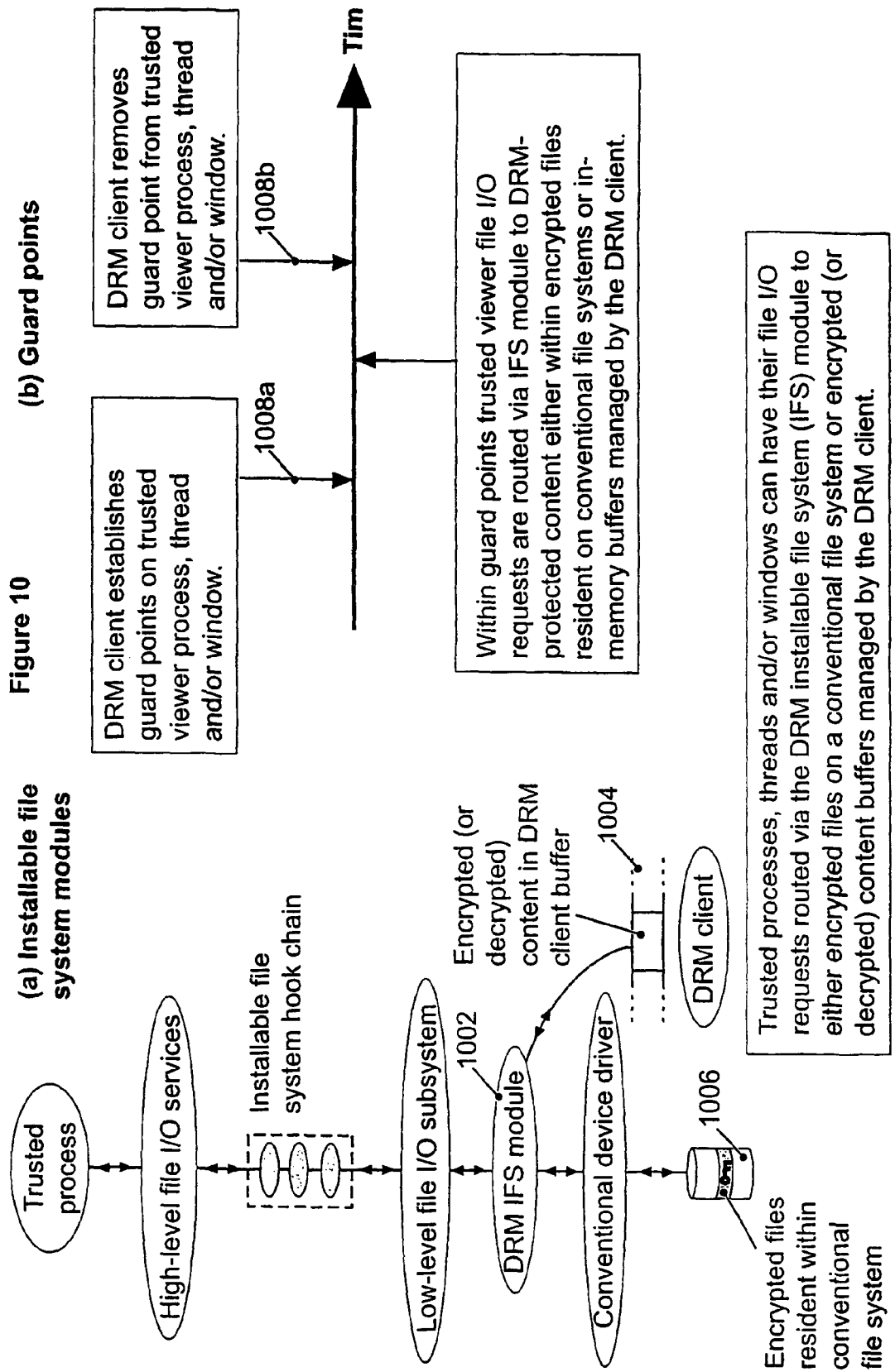
Figure 11:
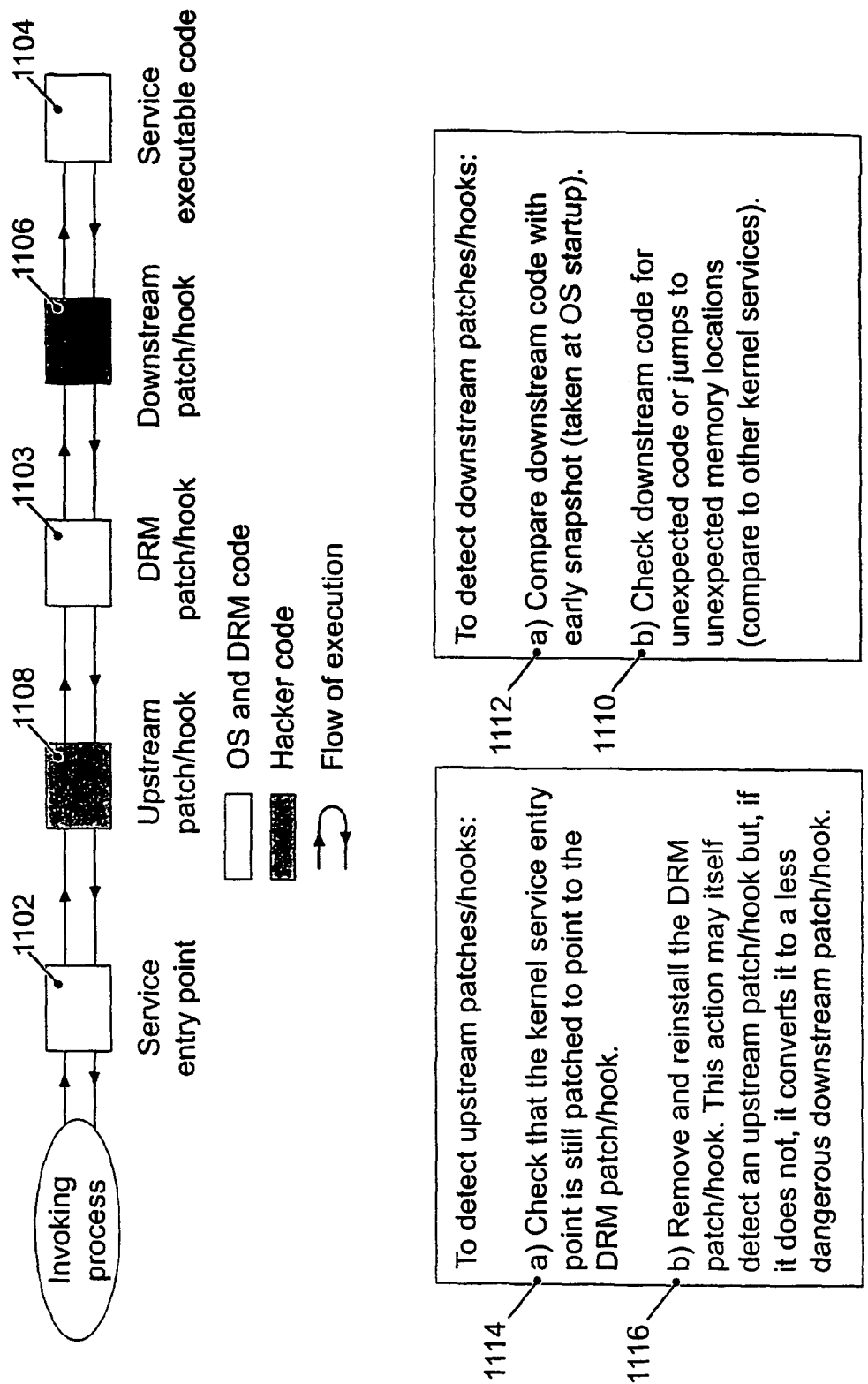

FIG. 10 illustrates schematically examples of DRM installable file system modules and the concept of establishing guard points on trusted processes, threads and/or windows in accordance with an embodiment of the present invention; and, FIG. 11 illustrates schematically upstream and downstream patches/hooks and examples of DRM patching/hooking countermeasures in accordance with an embodiment of the present invention.

In the following, particular reference will sometimes be made to the Windows (and Windows related) and the Mac operating systems. Nevertheless, it will be appreciated that many embodiments of the present invention are applicable to a wide variety of other operating systems.

According to one embodiment of the present invention, an OS kernel is patched (i.e. modified) so that a DRM client can "police" access to OS services that would otherwise directly or indirectly enable unauthorised access to DRM-protected content. An example of such an OS service is the set of graphics primitives offered by the graphical subsystem GDI32 on the Win32 (i.e. Windows 32-bit) operating system, e.g. BitBlt, StretchBlt, etc. These kernel primitives allow application developers to rapidly copy images to and from video memory and therefore can be used (and are used) to easily develop "screen grabbers" that copy the contents of the screen to a buffer which can then be saved to disk. If the DRM client is rendering DRM-protected images on the consumer device, it must somehow defend against unauthorised "grabbing" of these images. This can be achieved by patching the OS services, such as BitBlt, StretchBlt, etc., such that the DRM client can first check whether they are being used to access images rendered by the DRM client and, if so, to substitute the protected image with something else (e.g. a warning message). If the OS services are being used for purposes not involving the DRM client or DRM-protected content, then the patched OS services are executed exactly as if they had not been patched.

Although a concrete example has been given in the context of graphics primitives on Win32 platforms, it will be appreciated that the general concept of patching OS kernel services to secure DRM-protected content can be applied to any relevant OS kernel service. This technique provides an extremely powerful means of providing security at a low level to operating systems that were not originally designed to be secure.

Most, if not all, modern operating systems appear to application software developers as a set of loadable modules, each of which provides a set of specific low-level services (e.g. file input/output, network communications, etc.) via defined entry points. Application software loads these modules into virtual memory and invokes these services by calling into the entry points (i.e. effectively transferring CPU execution to the address of the entry point). These modules may be shared between processes in order to conserve virtual memory.

Figure 1:
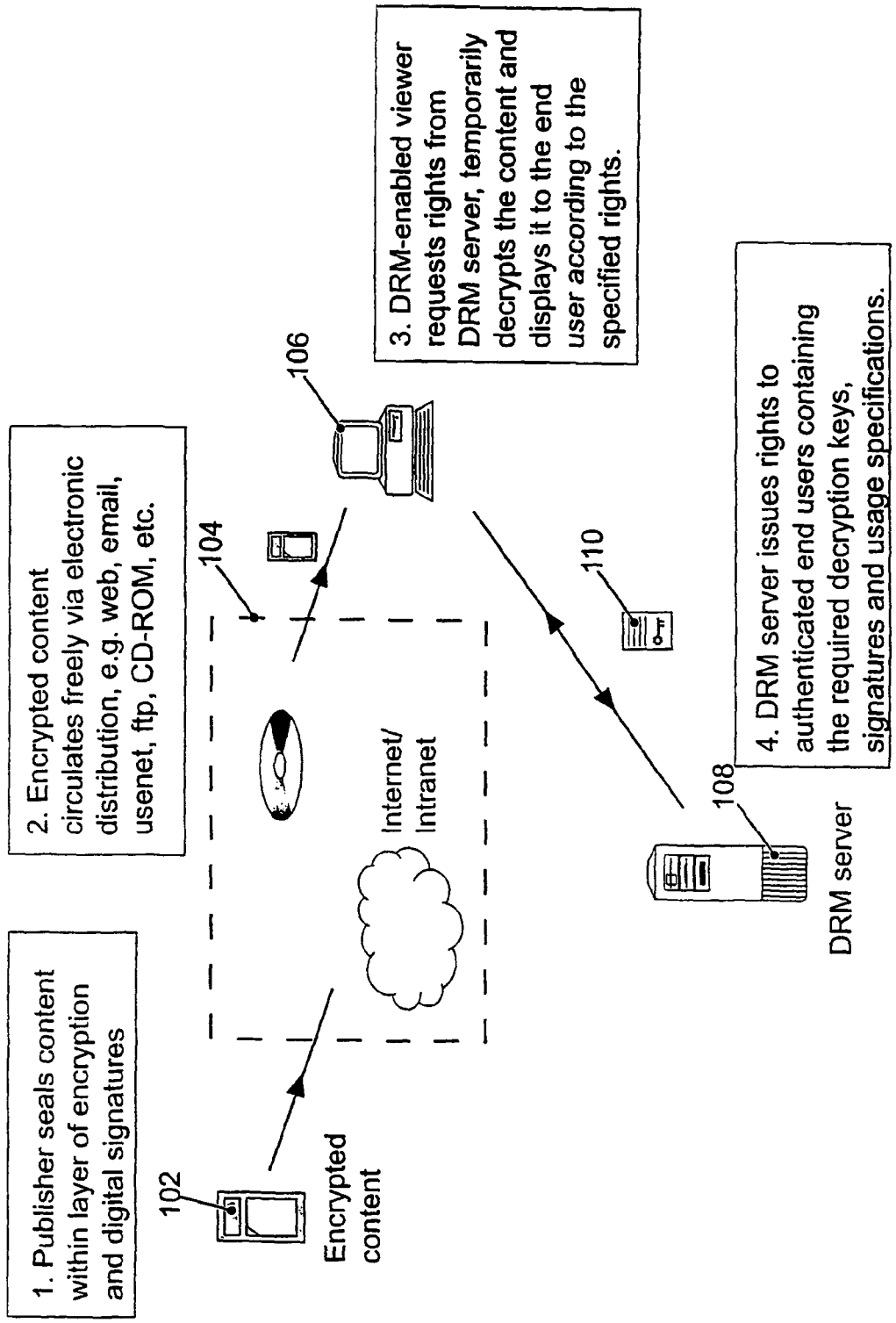
FIG. 1 illustrates schematically a DRM overview.
Figure 2:
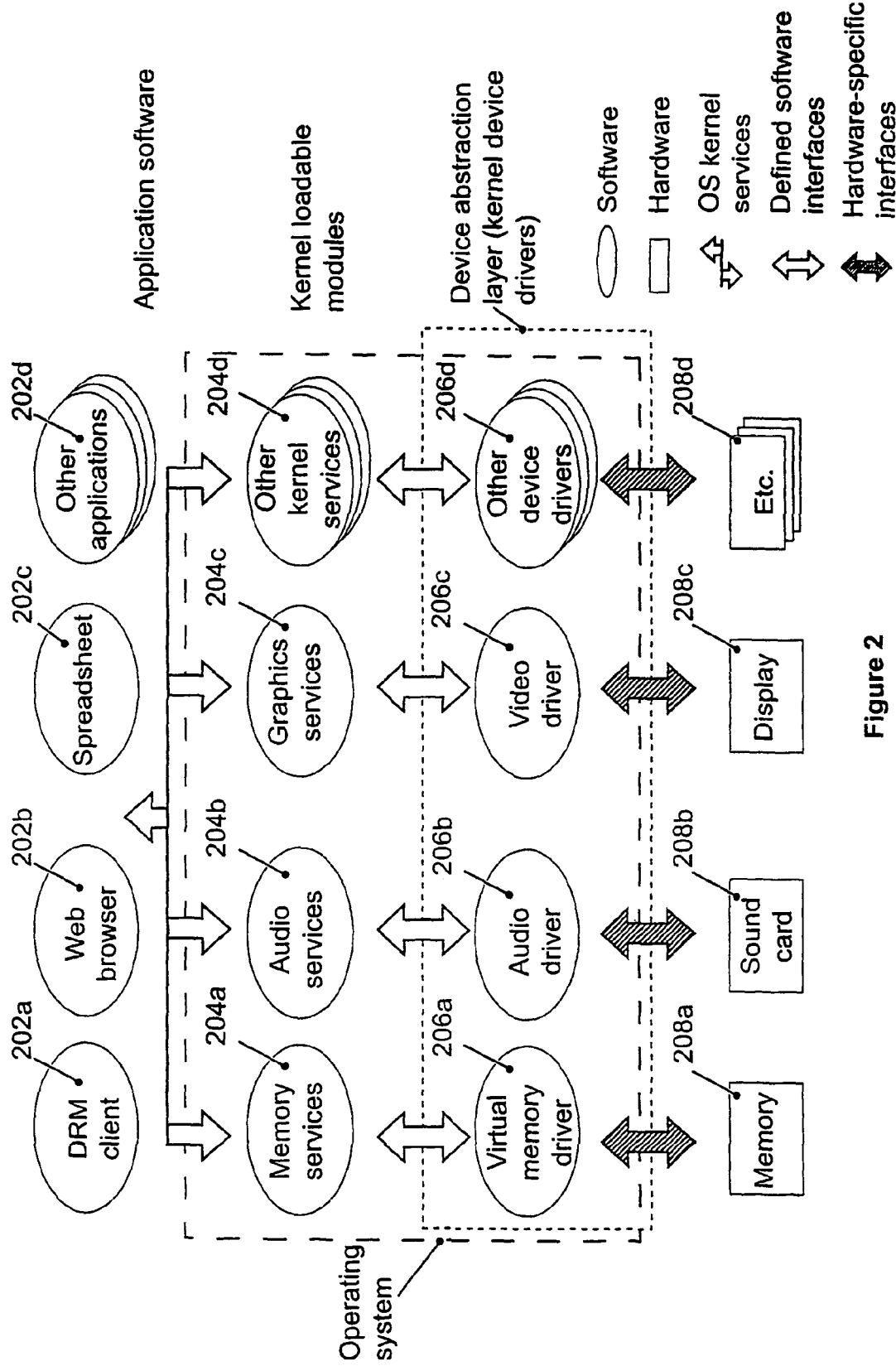
FIG. 2 illustrates schematically the various hardware and software components within a typical consumer device running a modern OS.
Figures 3A, 3B, 3C:
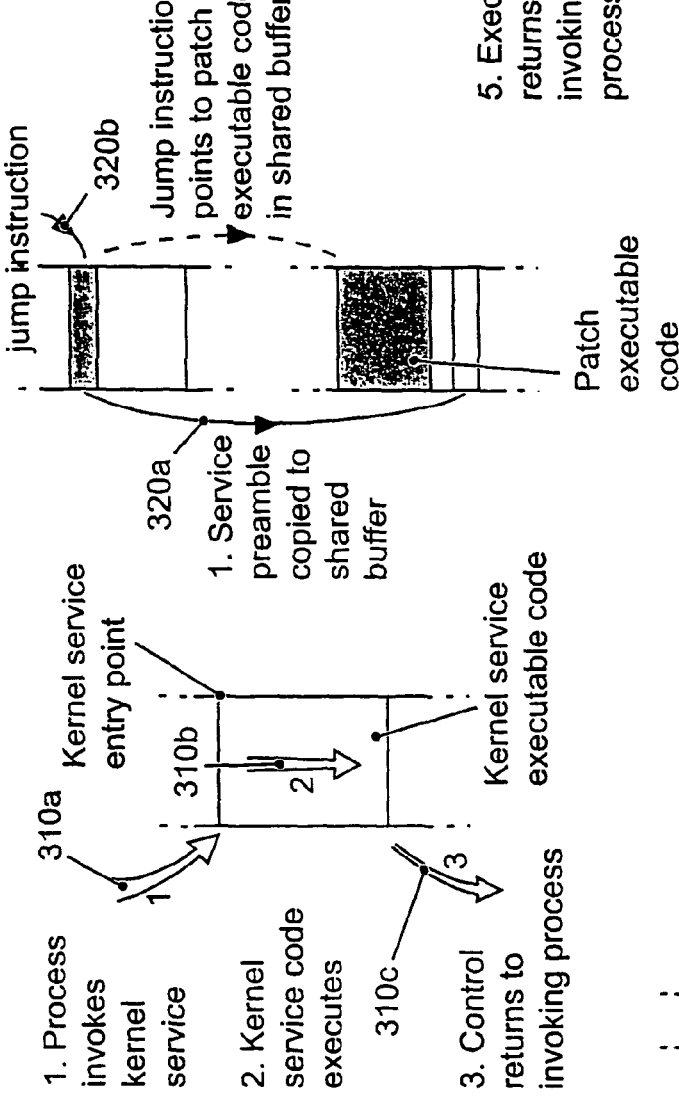
FIG. 3A illustrates schematically execution of a kernel service that has not been patched.
FIG. 3B illustrates schematically an example of a kernel patching process in accordance with an embodiment of the present invention.
FIG. 3C illustrates schematically an example of execution of a kernel service after patching in accordance with an embodiment of the present invention.

FIG. 3A illustrates schematically execution of a kernel service that has not been patched. Referring to FIG. 3A, a process invokes a kernel service at 310a by calling the entry point of the service. The kernel service code is executed at step 310b. After completion of the execution of the executable code, control is returned to the invoking process at step 310c.

As described above, the loadable modules can be patched to enable the DRM client to alter the operation of these services to protect DRM-protected content. As noted above, the DRM client is responsible for (temporarily) decrypting and rendering DRM-protected content to the output devices of the consumer device. Before the decrypted content is rendered, the DRM client or some other device patches any OS kernel services that are considered to present a possible threat. FIG. 3B illustrates schematically an example of a preferred kernel patching process.

Referring to FIG. 3B, the DRM client executes the following sequence of operations for each kernel service it needs to patch:

1. Load the OS loadable module exporting that service into the DRM client's process space (if it is not already loaded).
2. Obtain the address of the entry point of the service to be patched.
3. Copy a number of bytes from the beginning of the service entry point to a shared buffer at step 320a. The number of bytes is sufficient to contain a standard "jump" instruction (normally an op code plus a few bytes of address or offset) or a standard "trap" instruction (i.e. an instruction that throws a software interrupt which can be intercepted by a trap handler which transfers execution to a new location, which is effectively a jump). These bytes are also referred to as the "service preamble".
4. Replace the copied preamble bytes at the beginning of the service entry point with a "jump" instruction pointing at an in-process buffer containing the executable patch code for the OS service at step 320b.

As shown in FIG. 3C, after this patched service entry point is executed at step 320c by a process invoking the patched kernel service, control is transferred to the patch code in the shared buffer, step 302d. At step 320e, the patch code performs its checks (e.g. checking that the video memory being accessed by a graphics service does not contain DRM-protected imagery) and then optionally executes the original kernel service (if required and permitted by the DRM client). As well as performing checks, the patch code can perform arbitrary operations, e.g. replacing DRM-protected images with a warning message if appropriate.

As shown at step 320f, the original service can, if permitted, be executed by either (a) copying back the service preamble and transferring control to the original service entry point or (b) executing the preamble from the buffer to which it was copied and then transferring control to the remainder of the original service, i.e. the instruction after the removed preamble code. The latter approach is viable if the copied preamble can be determined to contain complete CPU operations (which may span several bytes).

When the DRM client is not handling decrypted content (and therefore has nothing to defend), it can reverse the patching steps to un-patch the OS services and return the OS to normal insecure operation.

Each of the steps described above makes use of standard OS services which are available on all modern operating systems, e.g. loading OS modules, obtaining the address of service entry points, etc. If a given OS loadable module contains multiple services that require patching, then the patching and execution steps described above can be repeated without reloading the OS module.

Whilst the exact details of each operation will of course vary between different operating systems, the concept and methodology discussed herein of patching the OS kernel services to enable the DRM client to defend DRM-protected content is widely applicable.

Figure 4B:
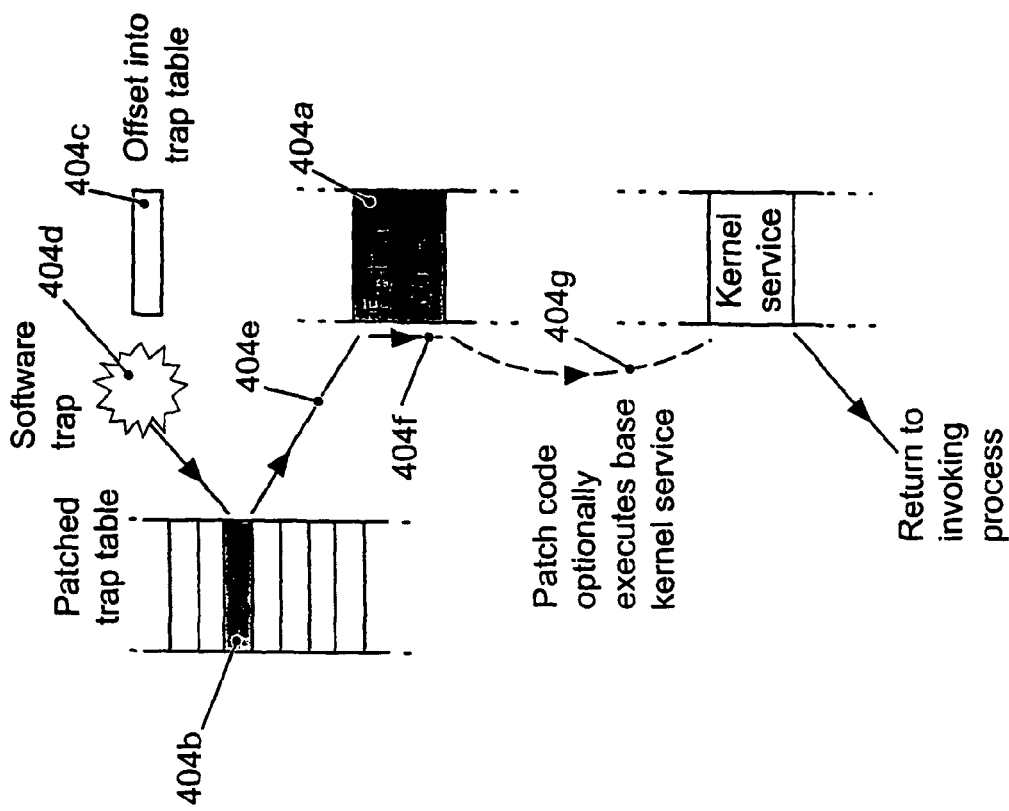
FIGS. 4A and 4B illustrate schematically an example of trap patching under MacOS in accordance with an embodiment of the present invention.
Figure 4A:
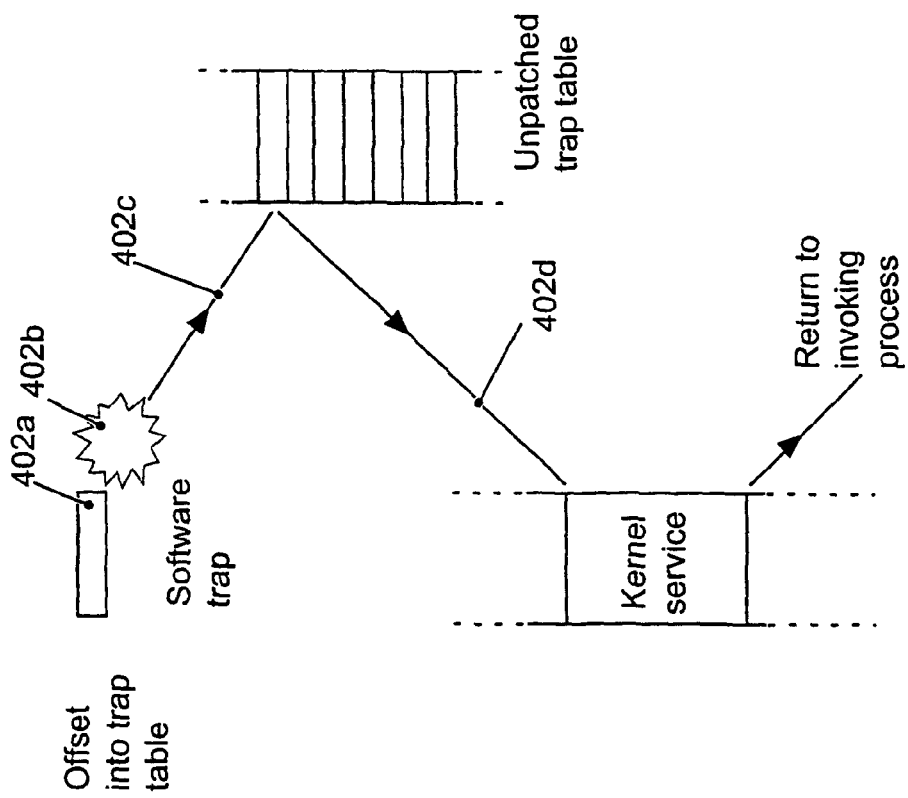

An example of the minor modifications required for different operating systems can be appreciated by comparing the Macintosh operating system, MacOS, (for versions prior to MacOS X) to Windows. The means by which applications access OS kernel service entry points is slightly different in each of these operating systems. FIGS. 4A and 4B illustrate schematically an example of trap patching under MacOS.

Referring first to FIG. 4A, under MacOS, applications access OS kernel service entry points by looking up an offset that identifies the particular entry point, loading this offset into a pre-defined location (step 402a), and firing a software interrupt (known as a "trap") (step 402b). A separate trap dispatcher handles the interrupt and looks up the offset set by the calling process (step 402c). This offset is used to look up the address of the desired kernel service from a table mapping offsets to service entry point addresses. The trap handler then transfers CPU execution to this address.

Referring to FIG. 4B, standard MacOS services enable "trap patching" whereby application processes (or special processes executed at OS start-up) can load a code fragment (the patch) into global memory (step 404a) and substitute the address of this patch in place of the actual kernel service entry point address in the trap dispatcher's table(step 404b). Thus, when the actual kernel service is loaded (step 404c), and a software interrupt is fired (step 404d), the trap handler transfers execution (step 404e), to the patch code. The patch code is then executed (step 404f) in place of the kernel service (although it can itself call the kernel service, as shown in step 404g), resulting in the same ability to patch kernel services with code that protects decrypted DRM content from other processes.

Whilst the details may differ between operating systems, one of ordinary skill in the art will have sufficient knowledge of modern operating systems to appreciate these differences.

If the patched OS module is shared by all other processes executing on the consumer device, then patching it within the context of the DRM client's process will cause it to be patched for all other processes. This is the case, for example, in simpler operating systems such as Windows 95 and 98.

If the patched OS module is not automatically shared by all other processes executing on the consumer device, then the patches are preferably propagated to those other processes. Otherwise, those other processes may allow access to the unprotected OS services that open security loopholes to the DRM-protected content.

Figures 5A, 5B:
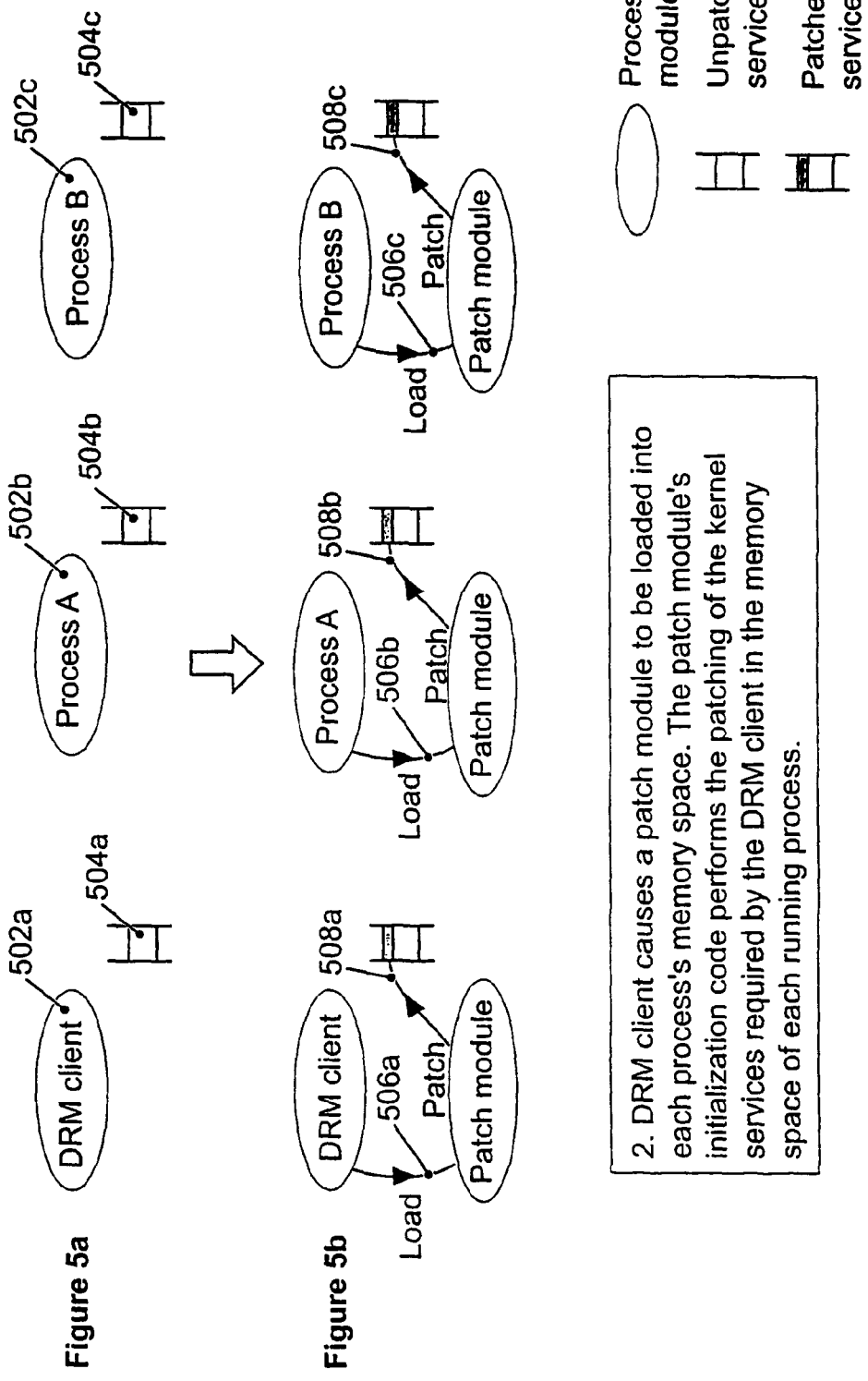
FIG. 5A illustrates schematically application processes running against unpatched kernel services.
FIG. 5B illustrates schematically the propagation of patches between processes by the forced loading of an example of a patching loadable module according to an embodiment of the present invention.

FIG. 5A illustrates schematically applications running against unpatched kernel services. Each process 502a, 502b, 502c has its own associated kernel service (504a, 504b and 504c respectively) which is not modified when another process patches its kernel service. On some operating systems, it may not be possible to patch OS kernel services for all processes from an already running process (in particular the DRM client) because of the use of "protected memory". Modern operating systems typically attempt to assign each process a completely independent region of virtual memory that is invisible and inaccessible to all other processes. This is an improvement over earlier operating systems where one process could accidentally overwrite memory from any other process, usually crashing the process or the entire OS.

An example of the difficulty this causes for patching kernel services is in MacOS where patching traps from a running process only affects the process which patched the trap (because each process has its own copy of the trap table which maps service offsets to service entry point addresses).

If it is not possible to patch OS kernel services for all processes from an already running process, then the OS kernel services can be patched from special modules loaded during OS start-up, i.e. before any application processes have been loaded. Most modern operating systems have specialised software modules that are loaded during the start-up of the OS (typically after switching on the consumer device or after a reboot). These modules are typically used to initialise the hardware and software components of the consumer device, e.g. network devices and various drivers. Because they are executed prior to any application software, they can often make (global) changes to the kernel that are automatically inherited by application software processes launched subsequently. For example, on MacOS these start-up modules, known as "inits" or "extensions", can install global trap patches that are inherited by all processes running on the consumer device. This enables the DRM client to patch and police the relevant kernel services, thus preventing other process from obtaining unauthorised access to the decrypted DRM-protected content.

As mentioned above, if the patched OS module is not automatically shared by all other processes executing on the consumer device then the patches are preferably propagated to those other processes. Otherwise, those other processes may allow access to the unprotected OS services that open security loopholes to the DRM-protected content.

An example of an operating system in which patched loadable OS modules are not shared between processes is Windows NT. Under Windows NT, the loadable modules that implement kernel services are initially shared between processes (to conserve virtual memory) but if they are to be modified, for example by the patching methodology described above, a copy of the unmodified loadable module is made and it is this copy that is modified. The other processes continue to share the unmodified loadable module. This handling of shared loadable modules is known as "copy-on-write" and is very common in modern operating systems. Unfortunately, it prevents patches made by the running DRM client process from being automatically propagated to other processes.

On modern operating systems, typically there are OS services that cause an identified module to be loaded into every process. For example, Windows provides an OS service called SetWindowsHookEx that installs a hook function that can be used to monitor windowing messages. This has the side effect that the loadable module containing the hook function is loaded into every process running on the consumer device. It is almost always the case on modern operating systems that loadable modules have initialisation and clean-up entry points that are called when the module is loaded into a process and unloaded from a process, respectively. If this is not the case, then initialisation and clean-up code can be executed from the DRM client process using any inter-process communication (IPC) mechanism, or, lazily, based upon subsequent execution of code by the process loading the module.

Thus, if necessary or desirable, code that performs the patching, as described above, is placed within a loadable module that is loaded into every process, using an OS service such as for example SetWindowsHookEx or any other suitable means available to force the loading of a module into every process space for a given OS. FIG. 5B illustrates schematically the propagation of patches between processes. When the module is loaded into each process on the consumer device at steps 506*a*, 506*b*, 506*c*, its initialisation code performs the in-process patching operation as described above at steps 508*a*, 508*b*, 508*c*. In this fashion, the patches are propagated across all the processes executing on the consumer device. When the DRM client wishes to remove the patches, it reverses the process by which it caused the patching module to be loaded into each process, e.g. by calling UnhookWindowsHookEx (the opposite of SetWindowsHookEx). As each process unloads the patching module, its clean-up entry point is called, which removes the patches from the OS modules of each process.

The techniques described above can be used to protect DRM-protected text and images (and video frames) from screen grabbing applications. Almost all application software accesses video memory indirectly, via a rich set of graphics services provided by the OS. This is for convenience, since application developers are presented with a large library of reusable graphics code, and also because of the chaos that would result if applications were not protected from overwriting each other's video memory. Modern OS graphics services typically implement a windowing concept whereby applications are issued with notional "windows" (actually high-level data structures managed by the OS) into which they can draw. The OS graphics service looks after ordering these windows with respect to each other, redrawing them when they are revealed by the movement of other windows, resizing them, etc.

Figure 6:
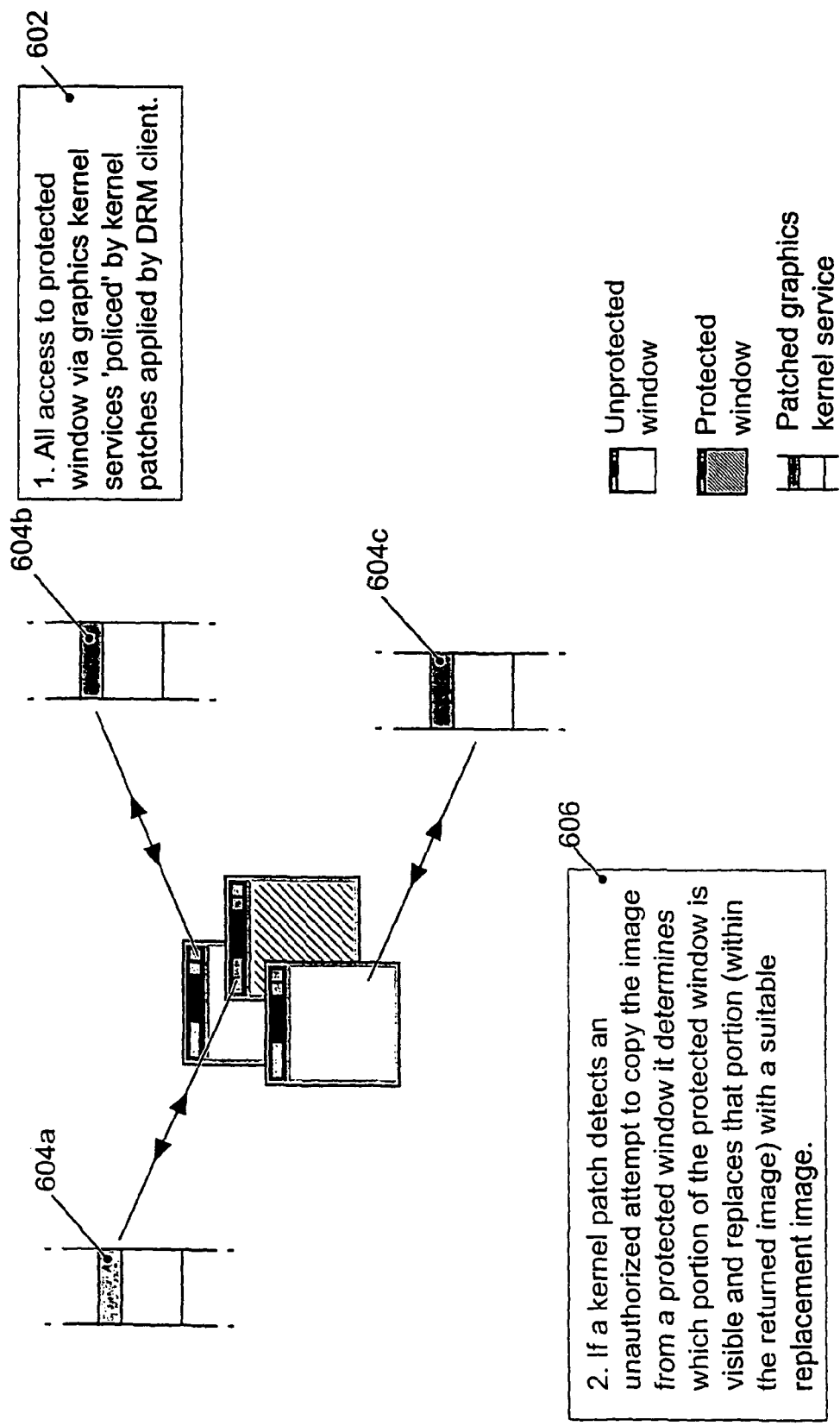
FIG. 6 illustrates schematically an example of a method of protecting video memory from screen grabbing according to an embodiment of the present invention.

FIG. 6 illustrates schematically an example of a method of protecting video memory from screen grabbing according to the present invention. The DRM client, in the case of DRM-protected text, images (and video frames), will be rendering this content (directly or via third party software components) to one or more of these "windows". Before it does so it adds the relevant windows to a list of "protected windows" maintained in a location accessible to all processes (e.g. in shared memory, on disk, etc.). At step 602, the DRM client then patches all OS services 604*a*, 604*b*, 604*c* that are capable of accessing the graphical images being rendered within these protected windows (e.g. the GetPixel OS service on Windows that recovers an individual pixel value from a nominated window and that could be used repeatedly to reconstitute the window's image).

At step 606, when the patched OS services are invoked, the patches look up the window to which they are being applied and, if it is on the list of protected windows, perform some defensive action. For example, the underlying graphics service can be applied to an artificial window containing some replacement graphic (using cropping and tiling to fit to arbitrarily sized windows as necessary), but any other action that defends the DRM-protected graphical images without adversely affecting the operation of the OS would suffice. If the window is not protected, the patches simply pass execution to the underlying OS service. When the DRM client is finished with a protected window, i.e. it is no longer using it to display DRM-protected content to the end user or the window has been closed, it can remove the window from the list of protected windows. If the window is the last window in the protected window list, the DRM client can safely remove the OS graphics services patches (if the patches are being applied dynamically, i.e. from the running DRM client process rather than for example at OS start-up).

It should be noted that on most modern operating systems, it is possible for the patch code to calculate which portions of a protected window are visible and which are obscured by another window (generally by traversing the window hierarchy in z-order, i.e. the order in which each window is layered above each other). By calculating a clip region corresponding to the obscured areas (most OS graphics kernel services provide means of calculating complex composite clip regions), it is possible to replace the protected image with a replacement image without preventing screen grabbing of unprotected areas. This is a considerable improvement over simply preventing grabbing of the entire screen or window.

The techniques described above can be used to implement a virtual file system whereby the DRM client can pass DRM-protected content to third party viewer components and applications without exposing the decrypted content on the consumer device's local file system (from which it could be recovered by hackers). The DRM client protects the encrypted content as far through the rendering and viewing/playing process as possible. It is not sufficient for the DRM client to simply decrypt the content and pass the decrypted content onto an insecure third party viewer (such as a web browser or audio player) since the decrypted content can easily be recovered from the third party viewer (for example, by examining the browser cache or clicking File . . . Save As on an audio player). To be secure, the DRM client preferably provides a secure viewing environment, i.e. it provides for a secure viewer/player for each supported media type. Since building secure viewer/players for each supported media type is expensive, DRM vendors typically use third party viewer/player components to ease this task. Unfortunately, many of these viewer/player components expect the decrypted content to be passed to them via the local file system (i.e. from disk), which represents a major security loophole. If the DRM client writes the decrypted content to disk so that it can be loaded into a third party viewer/player then a hacker can easily intercept the decrypted content at the time it is written to disk. Simply trying to hide the decrypted content by using temporary filenames and obscure locations (as is presently done in some systems) is ineffective since there are many freely available utilities capable of monitoring the local file system.

The OS kernel patching techniques described above can be used to implement a virtual file system by which the DRM client can decrypt the DRM-protected content to an in-process memory buffer which is accessible only to the trusted third party viewer/player component via patched kernel file input/output (i/o) services.

Figure 7:
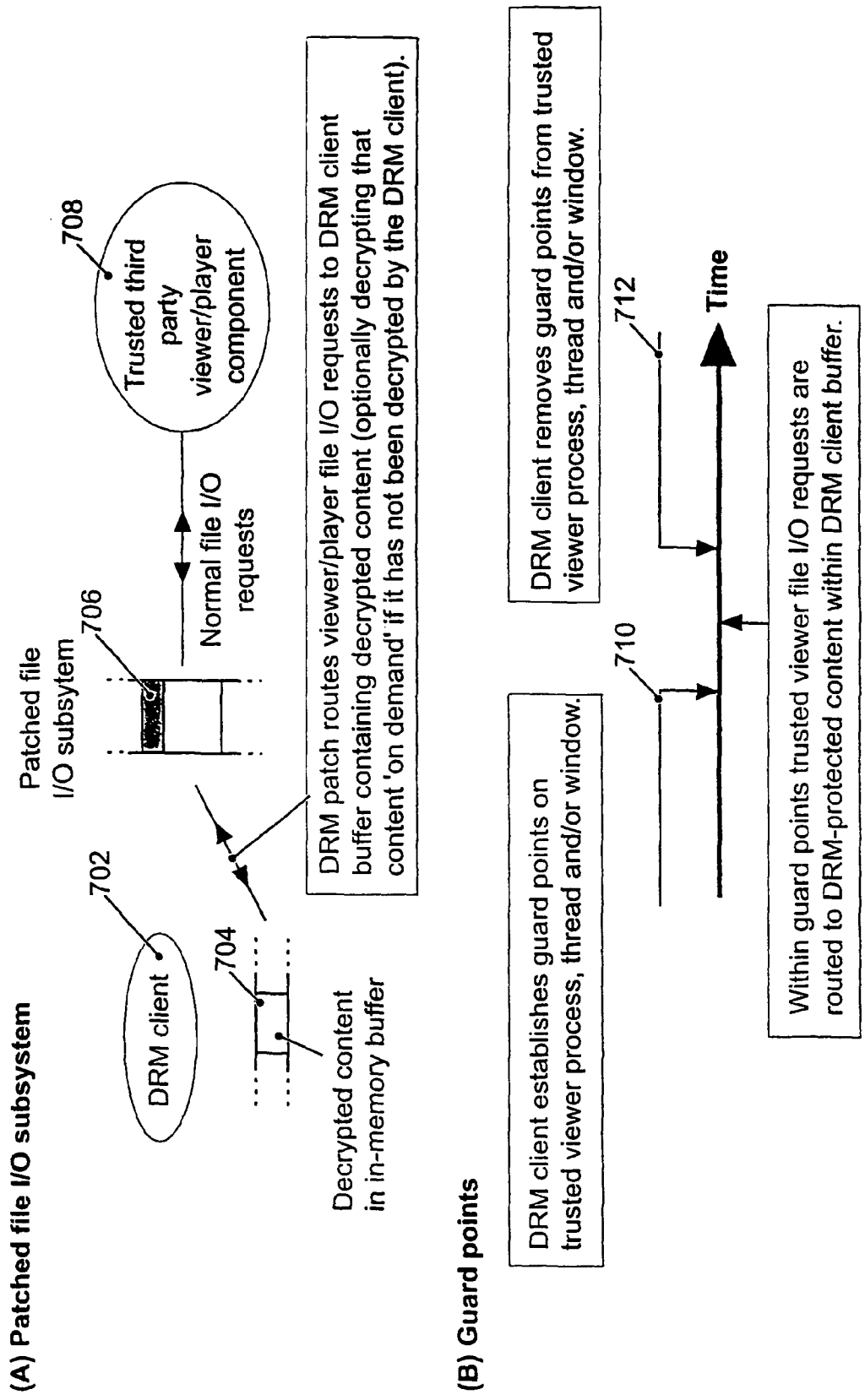
FIG. 7 illustrates schematically a virtual file system and the concept of establishing guard points on trusted processes, threads and/or windows in accordance with an embodiment of the present invention.

FIG. 7 illustrates schematically an example of a virtual file system and the concept of establishing guard points on trusted processes, threads and/or windows. An example of a sequence of operations which can be performed to provide a virtual file system and guard points is as follows:

1. The DRM client 702 decrypts the content into an in-process memory buffer 704.
2. The DRM client 702 patches the OS kernel file i/o services 706 used by the trusted third party viewer/player component (this may be done at OS start-up if it cannot be achieved dynamically from a running process; see the discussion on propagating patches above).
3. The DRM client invents a filename that does not exist on the local file system. The DRM client passes the filename to the trusted third party viewer/player component 708.

4. The trusted third party viewer/player component 708 opens the "virtual" file using the invented filename (which does not actually exist on the local file system). The patched kernel file i/o services detects attempts to read, seek or write from/to the "virtual" file and routes those requests to read, seek or write from/to the DRM client's in-memory buffer 704.

5. The DRM client and the patched kernel file i/o services cooperate to ensure that the virtual file is only being accessed from trusted processes, threads and/or windows (so that other "unauthorised" processes, threads and/or windows cannot access the virtual file while the decrypted buffer exists even if they can obtain the virtual filename). This is achieved by setting (step 710) and removing (step 712) "guard points" on trusted processes, threads and/or windows within which trusted viewer file i/o requests are routed to the decrypted content stored in the in-process memory buffer 704. This setting and removing guard points on trusted processes, threads and/or windows is important since otherwise an untrusted process could be used by a hacker to obtain access to the decrypted content by simply obtaining the filename of the virtual file and using normal file i/o services to read the decrypted virtual file. Setting and removing guard points is one way of keeping track (in a secure manner) of which processes, threads and/or windows are trusted at a given point in time by the DRM client.

6. When the trusted third party viewer/player no longer needs access to the virtual file, the DRM client can remove the in-process memory buffer containing the decrypted content and remove the virtual file from the list of such files handled by the patched kernel file i/o services.

This arrangement allows the DRM client to (i) use third party viewer/player components that expect input files without exposing decrypted content to the local file system (from where it can easily be hijacked by hackers); (ii) transparently load encrypted content into third party viewer/player components not originally intended to access encrypted content (e.g. encrypted Java into a standard browser Java Virtual Machine); and (iii) detect and prevent untrusted processes or threads from writing DRM-protected content to the local file system.

A useful modification to the virtual file system is for the DRM client to simply place the encrypted content into its in-process shared memory buffer and for the patched file i/o services to obtain decryption keys from the DRM client and decrypt the content on demand, as it is read by the trusted third party viewer/player. This has the advantage of reducing the amount of time for which the content is in its vulnerable decrypted state.

Device drivers are special software programs capable of operating within the OS kernel environment and of directly manipulating the low-level hardware components that make up the consumer device (e.g. memory, video memory, disk drives, etc.). Because of the high processor privilege levels within which they execute, device drivers can perform a number of functions not available to application processes that can considerably improve the reliability of the patching process(es) described above. Depending upon the OS, there are a number of well documented ways a high-level application process (such as the DRM client) can communicate with a device driver (and vice versa).

Figure 8:
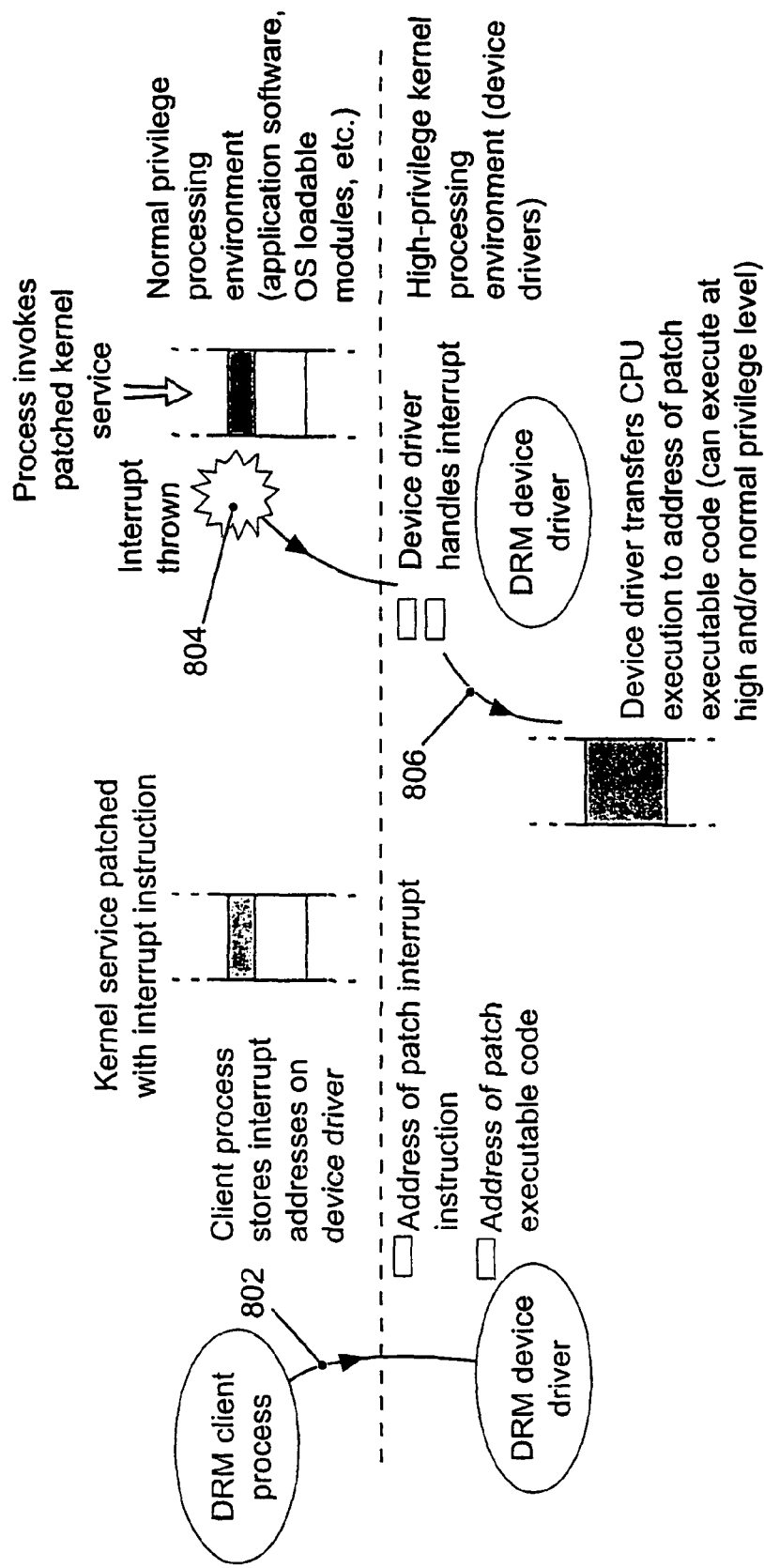
FIG. 8 illustrates schematically an example of use of a device driver to perform interrupt-based kernel-level patching.

Thus, a cooperating device driver can be used to enhance the DRM client patching process described previously. FIG. 8 illustrates schematically an example of use of a device driver to perform interrupt-based kernel-level patching.

There is a very small but finite risk that a given OS service entry point may actually be in the process of being executed whilst the service preamble is being patched by the DRM client unless the preamble replacement can be performed by a guaranteed atomic operation, i.e. one that cannot be interrupted. On many operating systems, patching the service preamble involves replacing it with a "jump" operation which is too long to copy over the preamble in a single atomic operation. If an OS service entry point is executed whilst the service preamble is being patched, the results would be unpredictable but would probably result in a crash of the affected process or even the entire OS. Device drivers can hook hardware and software interrupts as part of their basic capability of interfacing to physical devices and the low-level kernel. On most operating systems, there are very short (typically but not always a single byte) operations that can generate a software interrupt. This operation can be copied over the service preamble in an atomic operation. This can be used to implement a jump using a short operation that can safely be patched over the existing service entry point preamble.

Thus, in an example, at step 802 the DRM client calls down to the device driver to register the jump address, associating it with the address from which the software address would be thrown. When the patch interrupt is thrown (because the process has invoked the patched service entry point) at step 804, the device driver at step 806 intercepts the interrupt, looks up the address from which it was thrown and the associated jump address and then transfers control to that address, in effect executing the jump to the DRM client's patch routine. This approach has the additional advantage that it allows the DRM client to patch extremely short OS service preambles (the service preamble may immediately jump to some adjoining code, which requires very few bytes on many operating systems).

On some operating systems, a privileged device driver is required to make the memory of the loadable module writeable so that it can be patched. Whilst there are means of doing this directly from an application, they are usually difficult and potentially unreliable.

Some functionality required by DRM clients, such as installing a file system hook (see below), can only be implemented in the privileged environment of a device driver.

The local file system on most modern operating systems is implemented by kernel-level device drivers that sit between the hardware storage devices (e.g. hard disks, floppy disks, CD-ROMs, etc.) and application processes. The file i/o subsystem of the OS kernel provides a uniform, well-defined interface to these disparate storage devices which enables application processes to read and write from/to these devices via the uniform interface without worrying about the precise details of each storage device. A common feature of the file i/o subsystems provided by modern operating systems is the ability to install a file system hook. A file system hook is a software function that can be installed into the file i/o subsystem such that it can intercept, monitor and modify or replace each low-level file i/o operation. File system hooks are generally: (i) implemented sufficiently deep within the file i/o subsystem that all higher-level file i/o service requests are routed through them; (ii) required to run in a privileged process (and therefore must usually be installed from, and implemented within, a kernel-level device driver); and (iii) implemented in a hook chain in which multiple file system hooks can be installed with the most recently installed hook being called first and (optionally) calling down into the next hook until (optionally) the original file i/o service is called. Nothing requires a particular file system hook to call further hooks in the chain (or the original service) and most file system hooks can only detect the next hook in the chain.

Figure 9:
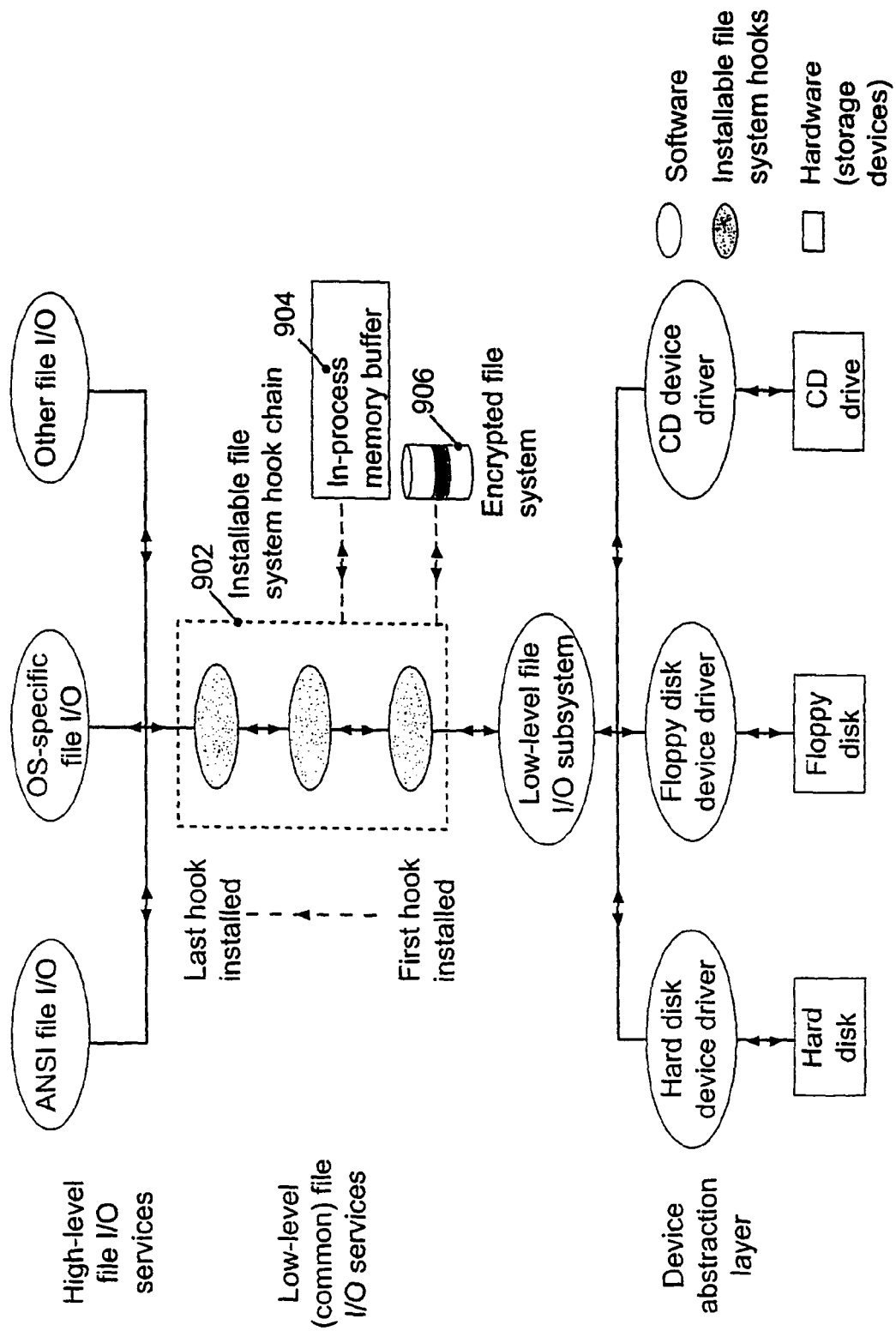
FIG. 9 illustrates schematically examples of the use of installable file system hooks in accordance with an embodiment of the present invention.

In view of the above, installable file system hooks can be used by DRM clients to improve OS security. FIG. 9 illustrates schematically examples of such use of installable file system hooks in a representative OS.

1. Patching the OS kernel. In some embodiments described elsewhere herein, the kernel loadable modules are patched after they are loaded into virtual memory. These kernel loadable modules are actually loaded from special files on the local file system during OS start-up or on-demand by application processes. An alternative method of patching the kernel loadable modules is to use file system hooks to intercept the low-level file i/o operations used when the kernel modules are being loaded into virtual memory and to modify those operations so that what is actually loaded into virtual memory is an appropriately patched version of the kernel loadable modules. This is a relatively straightforward process since the internal format of loadable modules is well documented.
2. Virtual file system. By installing a file system hook, the DRM client can effectively gain control over the file system. The routing of file system i/o to in-memory buffers containing decrypted content described above in connection with FIG. 7 with respect to the use of a virtual file system can be implemented by a file system hook 902 which can route trusted invocations of the file i/o services to the DRM client's in-process memory buffer 904. The DRM client can establish trusted invocations by only routing requests to the decrypted buffer between start and stop guard points set on trusted processes, threads and/or windows. As noted previously, the setting and removing guard points on trusted processes, threads and/or windows is important since otherwise an untrusted process could be used by a hacker to obtain access to the decrypted content via the installable file system hook, simply by obtaining the filename of the virtual file and using normal file i/o services. Setting and removing guard points is one way of keeping track (in a secure manner) of which processes, threads and/or windows are trusted at a given point in time by the DRM client.
3. Secure file systems. File system hooks can be used to route file system i/o to an encrypted portion of the file system 906, with only trusted invocations of the file i/o services (see above) being able to transparently decrypt the files stored within the encrypted portion of the file system. Untrusted invocations of the file i/o services only see the encrypted files. Files stored in the encrypted portion of the file system can be identified for example by some characteristic of their filenames, e.g. a certain root device. The encrypted portion of the file system could be used to store DRM-protected content and associated licensing information.

It is noted that the local file system on most modern OS is implemented by kernel-level device drivers that sit between the hardware storage devices (e.g. hard disks, floppy disks, CD-ROMs, etc.) and application processes. The file i/o subsystem of the OS kernel provides a uniform, well-defined interface to these disparate storage devices which enables application processes to read and write from/to these devices via the uniform interface without worrying about the precise details of each storage device. Another common feature of the file i/o subsystems provided by modern operating systems is the concept of installable file systems whereby support for new storage devices can be added to a consumer device by simply installing new kernel-level loadable modules that "plug into" the file i/o subsystem without disturbing the uniform interface presented to application processes. These installable file system modules (IFS modules) need not actually make use of a real, physical device. For example, they can implement file systems within RAM or within encrypted or compressed files resident on other file systems.

DRM clients can use installable file systems in a variety of ways, some of which are described below. FIG. 10 illustrates schematically examples of DRM installable file system modules and the process of establishing guard points on trusted processes, threads and/or windows.

1. Virtual file system. The virtual file system described above can be implemented by an IFS module since routing file system i/o to in-memory buffers or encrypted or compressed files within other file systems is exactly what IFS modules are designed to do. IFS module 1002 can route trusted invocations of file i/o services to either the DRM client's in-process memory buffer 1004 or encrypted files resident within a conventional file system 1006. Provided the invocation was trusted, the IFS module can optionally decrypt the content "on-the-fly" or, more simply, access a pre-decrypted buffer. The former would be more appropriate for encrypted files resident within a normal file system, the latter for content resident within a DRM client buffer. The DRM client can establish trusted invocations by only routing requests to the decrypted buffer between start 1008a and stop guard points 1008b set on trusted processes, threads and/or windows. The setting and removing guard points on trusted processes, threads and/or windows is again important since otherwise an untrusted process could be used by a hacker to obtain access to the decrypted content via the IFS module, simply by obtaining the filename of the virtual file and using normal file i/o services.
2. Secure file systems. An IFS module can be used to route file system i/o to an encrypted portion of the file system, with only trusted invocations of the file i/o services (see above) being able to transparently decrypt the files stored within the encrypted portion of the file system. Untrusted invocations of the file i/o services only see the encrypted files. Files stored in the encrypted portion of the file system can be identified for example by some characteristic of their filenames, e.g. a certain root device. The encrypted portion of the file system can be used to store DRM-protected content and associated licensing information.

Some of the techniques used in the preferred embodiment of the present invention for retrofitting low level security to insecure operating systems, such as patching low-level kernel service and installing file system hooks, are techniques that are known per se and are also available to an expert hacker. Thus, measures may be taken to protect the DRM client from subversion by the very techniques the DRM client is using to provide security.

FIG. 11 illustrates schematically upstream and downstream patches/hooks and examples of DRM countermeasures. Patching low-level kernel services and installing file system hooks are inherently similar in their vulnerability to countermeasures. In the case of patching, the DRM client inserts a patch stage 1103 between the kernel service entry point 1102 and the kernel service executable code 1104. It is possible for a hacker to have inserted a separate patch before the DRM patch was installed (downstream patch) 1106 or to insert a separate patch after the DRM patch was installed (upstream patch) 1108 or both. The hacker patches are known as downstream and upstream patches because, in the worst possible case, the execution flow from the service entry point is via upstream patch(es) followed by DRM patch followed by downstream patch(es) followed by the actual service executable code. In the case of installing file system hooks, the hooks are generally installed in a chain with the latest hook only knowing about the address of the previous hook in the chain, which may be the address of the actual file system i/o service executable code. Again, a hacker could insert both upstream and downstream hooks.

The threats to the DRM client of hacker-installed patches or hooks, and the means by which they can be detected and circumvented, are broadly similar for patching or hooking, so the remainder of this discussion uses terminology for patching with the understanding being that this discussion pertains to hooking as well.

DRM security is threatened by hacker-installed upstream and downstream patches. In the case of upstream patches, the DRM patch will be invoked by the upstream patch that is effectively masquerading as the invoking trusted process, thread and/or window. If the DRM patch returns secrets to the upstream patch, then security is compromised. For example, the DRM patch could be returning decrypted content from a file i/o read operation against the virtual file system as discussed above which would then be passed back to the upstream patch which could, for example, save it to disk.

In the case of downstream patches, the DRM patch may make use of the underlying kernel service executable code to perform its function. When a downstream patch is present, it is effectively masquerading as the kernel service executable code and if the DRM patch passes it any secrets then security is also compromised. For example, i-the DRM client has patched a graphical subsystem primitive that copies bitmaps from the screen (e.g. CopyBits on the Mac) so as to protect the screen from screen grabbing, then it may actually use the underlying service to obtain the bitmap from the screen so that it can then modify that bitmap to exclude the protected windows. The downstream patch would then have access to that bitmap prior to it being modified to exclude the protected window and could, for example, save that bitmap to disk. Downstream patches are typically less dangerous to the DRM client than upstream patches and can often be avoided entirely by simply not passing secrets downstream.

Hacker-installed upstream and downstream patches are preferably detected and neutralised. For example, referring to FIG. 11, at step 1110, when first applying and subsequently executing a DRM patch, the DRM client can examine the code that is being patched for signs of downstream patches (e.g. unexpected code preambles or jumps to memory in unexpected locations, compared to other kernel services). If a downstream patch is detected then, depending upon the level of threat, the DRM client can deny service until the downstream patch is removed.

Alternatively, at step 1112, during OS start-up the DRM client can snapshot the kernel service (either the entire service or a limited preamble) for later use in downstream patch detection. The snapshot should be placed as early in the OS start-up process as possible and can for example store either a binary copy or a calculated hash (digest). A second snapshot is taken later. If the second snapshot is taken before applying the DRM patch, then the snapshot can be of the entire service or just a limited part, such as the preamble. Otherwise, if the second snapshot is taken after the DRM patch is applied, then the first and second snapshots should be of a portion which is not affected by application of the DRM patch. Any subsequent changes to the kernel service (or its preamble) will result in a detectable difference in the snapshot copy or digest.

Depending on the OS, it may or may not be possible for the DRM patch to detect upstream patches by looking at the kernel service entry point and making sure that it is still being redirected to the DRM patch (step 1114). When it is not possible to do this directly, one useful technique is to attempt to remove and/or reapply the DRM patch every time it is predicted it will be used, e.g. when the DRM client sets the guard points on the trusted process, thread and/or window (step 1116). This effectively converts upstream patches into less dangerous downstream patches and often results in the detection of upstream patches. For example, installing a file system hook into a hook chain usually returns the address of the previous hook in the chain. If, after removal and reapplication of a DRM hook, the returned address is not that of the DRM hook then the DRM client knows that is has detected an upstream hook and can decide whether or not to deny service.

Embodiments of the present invention have been described with particular reference to the examples illustrated. However, it will be appreciated that variations and modifications may be made to the examples described within the scope of the present invention.

The invention claimed is:

1. A method for controlling access to digital rights management (DRM) protected content that is to be protected from unauthorised access, the method comprising:
   loading a DRM client responsible for temporarily decrypting and rendering the DRM-protected content, the DRM client being provided separately to the DRM-protected content;
   if not already loaded, loading code for executing an operating system service into memory;
   if the operating system service is operable to enable unauthorised access to protected content when the DRM client is handling said content, obtaining an address of an entry point of the loaded code in memory, and
   when the DRM client is handling decrypted DRM-protected content, placing, within the loaded code and starting at the entry point address, a replacement instruction such that, when the operating system service is to be executed the replacement instruction is executed in place of the operating system service, the replacement instruction causing substitute code to be executed, the substitute code operating to restrict or deny access to the DRM-protected content.

2. A method according to claim 1, wherein the replacement instruction is a jump instruction.

3. A method according to claim 1, comprising, after the substitute code is executed, returning the operating system service to an unmodified state.

4. A method according to claim 3, wherein the method further comprises, prior to placing of the replacement instruction, copying to a buffer a service preamble starting at the entry point address and wherein the returning of the operating system service to an unmodified state includes restoring the service preamble that was copied to the buffer to its original position at the entry point address and returning control to the entry point address.

5. A method according to claim 3, wherein the method further comprises, prior to placing of the replacement instruction, copying to a buffer a service preamble starting at the entry point address and wherein the returning of the operating system service to an unmodified state includes executing the service preamble from the buffer to which it was copied and then returning control to a point just after the place from which the service preamble was copied.

6. A method according to claim 1, wherein the operating system service is modified before any application processes are loaded.

7. A method according to claim 6, wherein an initialisation module is loaded before any application processes have been loaded, and wherein the placing of the replacement instruction is based on instructions in the initialisation module.

8. A method according to claim 7, wherein the initialisation module is loaded into every application process.

9. A method according to claim 1, wherein a loadable module has initialisation code which when executed causes said placing to take place and wherein the loadable module has clean-up code which when executed causes said modifying to be undone, the method comprising loading the loadable module into every running application process.

10. A method according to claim 9, wherein the loading of the loadable module is carried out as a result of the execution of another operating system service.

11. A method according to claim 9, wherein the act of loading the loadable module into a running application process causes the initialisation code to be executed.

12. A method according to claim 9, wherein the act of unloading the loadable module from a running application process causes the clean-up code to be executed.

13. A method according to claim 9, comprising a digital rights management client operating via an inter-process communication mechanism to cause the loadable module to execute its initialisation code and clean-up code within the context of each running application process.

14. A method according to claim 9, wherein running of an application process into which the loadable module has been loaded calls the loadable module thereby to cause the placing to be carried out.

15. A method for controlling access to content that is to be protected from unauthorised access, the method comprising:
if not already loaded, loading code for executing an operating system service into memory;
if the operating system service is operable to enable unauthorised access to protected content, obtaining an address of an entry point of the loaded code in memory, and
placing, within the loaded code and starting at the entry point address, a replacement instruction such that, when the operating system service is to be executed the replacement instruction is executed in place of the operating system service, the replacement instruction causing substitute code to be executed, the substitute code operating to restrict or deny access to the protected content,
wherein the modification of the operating system service protects, from screen grabbing, at least a visible area of an image displayed on a screen.

16. A method according to claim 1, comprising implementing a virtual file system that can be used to communicate decrypted DRM-protected content to a renderer without exposing the decrypted DRM-protected content to unauthorised access via a local file system.

17. A method according to claim 16, comprising
passing to a renderer a filename for a virtual file;
requesting by the renderer access to the file; and,
routing the renderer's access request via the virtual file system to a buffer containing the DRM-protected content.

18. A method according to claim 17, comprising decrypting the DRM-protected content before placing the DRM-protected content in the buffer.

19. A method according to claim 18, wherein said encrypted portion of the file system contains DRM-protected content and associated licensing information.

20. A method according to claim 17, comprising placing encrypted DRM-protected content in the buffer, the modified operating system service obtaining a decryption key to decrypt the encrypted DRM-protected content on demand.

21. A method according to claim 1, comprising implementing a secure file system by which only trusted invocations of the operating system are permitted to decrypt encrypted DRM-protected files stored within an encrypted portion of the secure file system.

22. A method according to claim 1, comprising establishing guard points to indicate which processes, threads, and/or windows are trusted; and,
restricting execution of the operating system service only to the trusted processes, threads, and/or windows.

23. A method according to claim 1, wherein operation of the operating system service is modified by use of a device driver.

24. A method according to claim 1, wherein operation of the operating system service is modified by use of a file system hook.

25. A method according to claim 1, wherein operation of the operating system service is modified by use of an installable file system module.

26. A method according to claim 1, comprising inspecting the operating system service for the presence of a downstream patch or hook.

27. A method according to claim 26, wherein the inspecting of the operating system service includes comparing a snapshot of the operating system service with a snapshot of the operating system service obtained during operating system start-up.

28. A method according to claim 1, comprising detecting an upstream patch or hook by determining whether a patched operating system service entry point still points to substitute code installed by a digital rights management client.

29. A method according to claim 1, comprising detecting an upstream patch or hook by removing and then reinstalling a patch installed by the DRM client.

30. A computer-readable medium having stored thereon a computer program containing program instructions for causing a computer to perform a method according to claim 1.

31. A computer-readable medium according to claim 30, wherein the computer program is embodied in the DRM client.

32. A method according to claim 1, wherein the modification of the operation of said operating system service comprises modifying the executable preamble of the operating system service.

33. A method for controlling access to digital rights management (DRM) protected content that is to be protected from unauthorised access, the method comprising:
loading a DRM client responsible for temporarily decrypting and rendering the DRM-protected content, the DRM client being provided separately to the DRM-protected content:
running an untrusted application routine;
if not already loaded, loading code for executing an operating system service into memory;
prior to the application routine using the operating system service, when the DRM-client is handling decrypted DRM-protected content, determining whether use of said operating system service would cause said operating system service to access said decrypted DRM-protected content which is to be protected;
if so, obtaining an address of an entry point of the loaded code in memory, and
when the DRM-client is handling decrypted DRM-protected content, placing, within the loaded code and starting at the entry point address, a replacement instruction such that, when the operating system service is to be executed the instruction is executed in place of the operating system service, the instruction causing substitute code to be executed, the substitute code operating to restrict or deny access to the protected content.

34. A method according to claim 33, wherein the replacement instruction is a jump instruction.

35. A method according to claim 33, comprising, after the substitute code is executed, returning the operating system service to its unmodified state.

36. A method according to claim 35, wherein the modifying of the operation of said operating system service comprises, prior to placing of the replacement instruction, copying to a buffer a service preamble starting at the entry point address and wherein the returning of the operating system service to its unmodified state includes storing the service preamble that was copied to the buffer to its original position at the entry point address and returning control to the entry point address.

37. A method according to claim 35, wherein the modifying of the operation of said operating system service comprises, prior to placing of the replacement instruction, copying to a buffer a service preamble starting at the entry point address and wherein the returning of the operating system service to its unmodified state includes executing the service preamble from the buffer to which it was copied and then returning control to a point just after the place from which the service preamble was copied.

38. A method according to claim 33, comprising implementing a virtual file system that can be used to communicate decrypted DRM-protected content to a renderer without exposing the decrypted DRM-protected content to unauthorised access via a local file system.

39. A method according to claim 38, comprising:
passing to a renderer a filename for a virtual file;
requesting by the renderer access to the file; and,
routing the access request to a buffer containing the DRM-protected content.

40. A method according to claim 39, comprising decrypting the DRM-protected content before placing the DRM-protected content in the buffer.

41. A method according to claim 39, comprising placing encrypted DRM-protected content in the buffer, the operating system service obtaining a decryption key to decrypt the encrypted DRM-protected content on demand.

42. A method according to claim 33, comprising implementing a secure file system by which only trusted invocations of the operating system are permitted to decrypt encrypted DRM-protected files stored within an encrypted portion of the secure file system.

43. A method according to claim 42, wherein said encrypted portion of the file system contains DRM-protected content and associated licensing information.

44. A method according to claim 33, comprising:
establishing guard points to indicate which processes, threads, and/or windows are trusted; and,
restricting execution of the operating system service only to the trusted processes, threads, and/or windows.

45. A method according to claim 33, comprising inspecting the operating system service for the presence of a downstream patch or hook.

46. A method according to claim 45, wherein the inspecting of the operating system service includes comparing a snapshot of the operating system service with a snapshot of the operating system service obtained during operating system start-up.

47. A method according to claim 33, comprising detecting an upstream patch or hook by determining whether a patched operating system service entry point still points to substitute code installed by the DRM client.

48. A method according to claim 33, comprising detecting an upstream patch or hook by removing and then reinstalling a patch installed by the DRM client.

49. A computer-readable medium having stored thereon a computer program containing program instructions for causing a computer to perform a method according to claim 33.

50. A computer-readable medium according to claim 49, wherein the computer program is embodied in the DRM client.

51. A method for controlling access to digital rights management (DRM) protected content that is to be protected from unauthorised access, the method comprising:
initialising a DRM client for temporarily decrypting and rendering DRM-protected content, the DRM client being provided separately from the DRM-protected content;
obtaining an address in memory of an entry point of an operating system service, the operating system service operable to access graphical images being rendered on a screen, and
before the DRM client handles decrypted DRM-protected content, placing at the entry point address in memory a replacement instruction such that, when the operating system service is to be executed to access graphical images, the replacement instruction is executed in place of the operating system service, the replacement instruction causing substitute code to be executed, the substitute code operating to restrict or deny access to graphical images being rendered of the DRM-protected content.

* * * * *